UNITED STATES PATENT OFFICE.

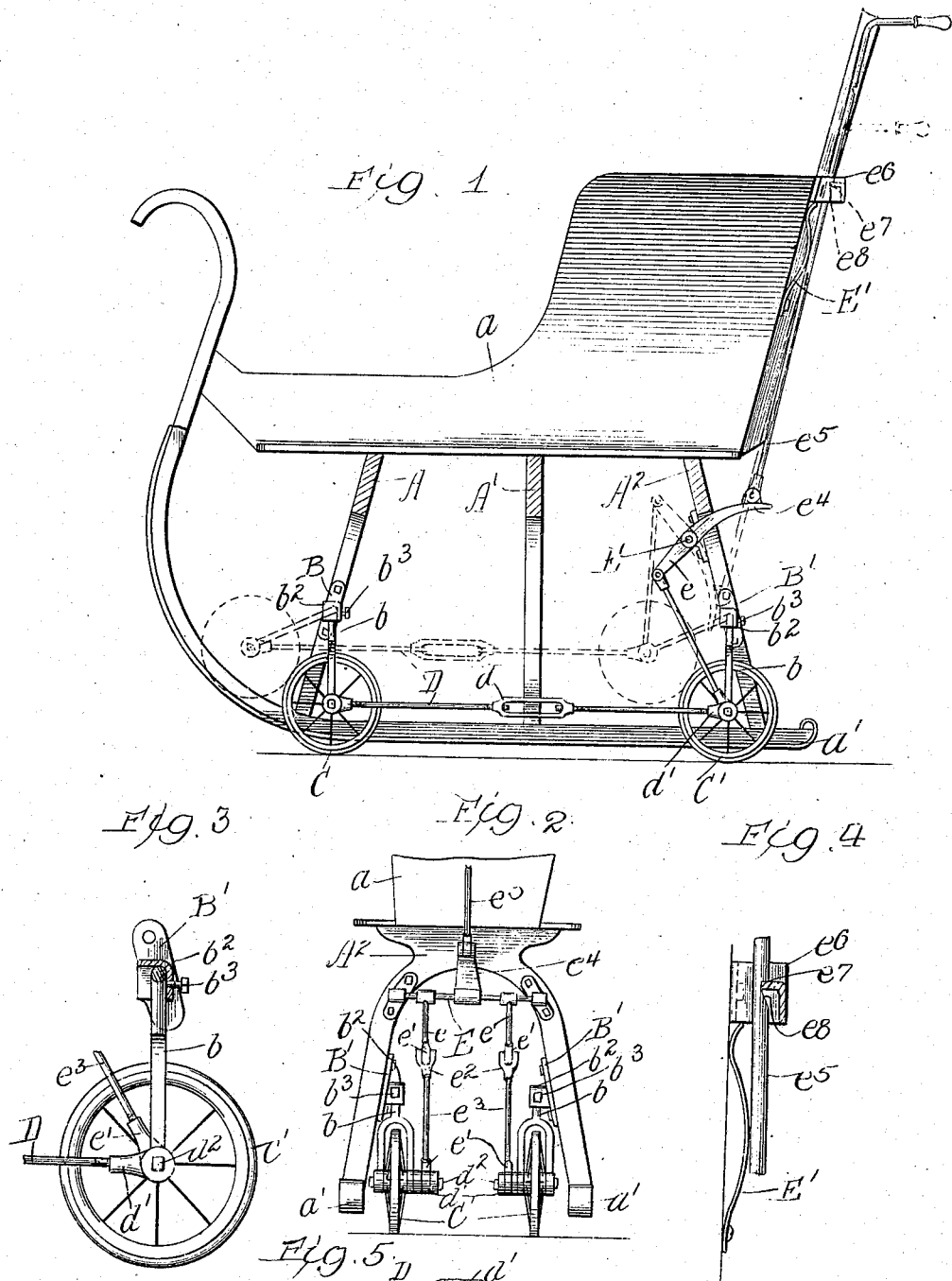

WILLIAM HAXTON, OF CHICAGO, ILLINOIS.

PERAMBULATOR-SLED.

No. 867,039.  Specification of Letters Patent.  Patented Sept. 24, 1907.

Application filed April 12, 1906. Serial No. 311,229.

*To all whom it may concern:*

Be it known that I, WILLIAM HAXTON, a citizen of the United States, and a resident of the city of Chicago, county of Cook, and State of Illinois, have invented certain new and useful Improvements in Perambulator-Sleds; and I do hereby declare that the following is a full, clear, and exact description of the same, reference being had to the accompanying drawings, and to the letters of reference marked thereon, which form a part of this specification.

This invention relates to a permabulator sled and has for its object the construction of a sled or sleigh adapted to be quickly converted into and used as a wheeled perambulator for infants.

The invention also has for its object the construction of a strong, cheap, simple and durable interchangeable vehicle of which the wheels can be quickly swung up out of supporting position when it is desired to use the vehicle as a sled.

It is also a further object of the invention to provide a running gear for a wheeled vehicle which may be quickly attached and adjusted to a sleigh of any preferred or usual construction thereby obviating the necessity for procuring a sleigh of special make.

The invention also embraces simple and positively operated mechanism for adjusting the parts relatively of each other and consists in the matters hereinafter described and more fully pointed out and defined in the appended claims.

In the drawings: Figure 1 is a side elevation partly in section of a device embodying my invention showing the same adjusted as a wheeled perambulator. Fig. 2 is a rear elevation of the same. Fig. 3 is a fragmentary detail of the bracket. Fig. 4 is a detail of the lock for the adjusting rod. Figs. 5 and 6 are side elevations of the connecting knuckles.

As shown in said drawings: A, A' and $A^2$ indicate the knees of the sled which may be constructed in any suitable manner and support the body $a$ upon the runners $a'$ as is usual. Said knees as shown are three in number though of course any desired number may be used. Rigidly secured upon the front and rear knees are brackets B—B' which are bolted on the inner side of each of said knees and are shaped to afford a pivot bearing for the yoke arms $b$ on which the wheels C—C' are journaled. Said arms may be of any desired length to suit the height at which said brackets are secured above the runners and carry the bearings or journals for the wheels thereon at or near said runners so that the wheels when thrown downwardly project below the runners.

Each bracket as shown is provided at the rear side with a downwardly directed integral wall or shoulder $b^2$ which permits the wheel carrying arm to assume a perpendicular position as shown in Figs. 1 and 3 but prevents the same from swinging backwardly. Said brackets are open on the front side however so that said wheels may be swung forwardly and upwardly as shown in dotted lines in Fig. 1 permitting the sled to be supported upon its runners. Connecting the wheels on each side at the axles is a rigid bar D provided with a turnbuckle $d$ therein whereby its length can be adjusted to approximately the distance between the brackets. Said bar D is provided at its ends with split knuckles $d'$ which have threaded engagement thereon and are engaged on the axle shafts $d^2$.

Inasmuch as the knees of different makes of sleds are not arranged at the same angle to the perpendicular it is necessary to provide means for adjusting the yoke arms $b$ to the perpendicular and for this purpose as shown a set screw $b^3$ is provided in each shoulder $b^2$, the inner end of which impinges the yoke arm below its pivotal point and may be set to limit the rearward swing thereof.

Journaled transversely of the rear knee in suitable brackets is a shaft E secured to which are forwardly directed levers $e$ one on each end thereof and which are provided on their lower ends with knuckles $e'$ having threaded engagement thereon and to which are pivotally engaged by means of knuckles $e^2$ similar to the knuckles $d'$, the outer ends of the connecting rods $e^3$ the opposite ends of which are secured by knuckles similar to the knuckles $e'$ to the pivot or axle of each rear wheel. Secured as shown near the middle of said shaft E is a rearwardly directed arm $e^4$, shaped on its under side at its outer end to be engaged by the foot and near the outer end thereof is pivotally secured an adjusting rod $e^5$ which extends upwardly at the rear end of the sled and through a suitable bracket $e^6$ provided with an inwardly directed detent or tongue $e^7$ adapted to engage in notches $e^8$ in said adjusting rod and hold the same in adjusted position. Secured on the rear of the sled, in position to bear against the rod $e^5$ is a spring E' which acts normally to prevent disengagement of the notches from said tongue $e^7$. Said rod is provided with a handle at its upper end for manual engagement and by means of which the wheels are thrown into or out of operative position.

The operation is as follows: The brackets owing to the extensibility of the rods D by means of a turn buckle may be secured upon the knees of any hand sled and adjusted so as to maintain the arms $b$ for the front and rear wheels in parallel relation both when the wheels are thrown upwardly as shown in dotted lines in Fig. 1 or when turned downwardly to support the sled and its load. The shoulders $b^2$ of the brackets B and B' or the set screws $b^3$ therein act to rigidly brace said arms from being carried rearwardly by the resistance of the road or surface over which propelled. When the wheels are not in use the same are supported, as shown in dotted lines in Fig. 1 and the sled rests on its runners. The adjusting rod $e^5$ firmly holds the wheels in either of the adjusted positions inasmuch as the tongue $e^7$ is held in engagement in a notch in said rod by means of the spring E'. Should it be desired to propel the sled upon the wheels the handle is pushed forwardly to release the adjusting rod $c^5$ from the tongue and the handle lifted to drop the wheels upon the ground. A slight upward pull on the handle, perhaps assisted by the foot which engages beneath the lever $e^4$ lifts the sled forwardly swinging the same upon the arms $b$ to the position shown in Figs. 1 and 2 and the sled may then be propelled upon the wheels which owing to the shoulders $b^2$ in said bracket are rigidly held from rearward movement.

The wheels and adjusting means therefor can be applied to any sled for if the distance between the knees of the sled be greater or less than shown the rod D is shortened or extended by means of its turnbuckle to maintain the arms $b$ at all times in parallel relation to insure both wheels clearing when swung forwardly and also to insure uniform adjustment when supporting the sled upon the wheels.

Obviously details of construction may be varied without departing from the principles of my invention.

I claim as my invention:

1. A sled, wheels carried thereon, a rod connecting the wheels on the same side of the sled and adapted to adjust the distance between said wheels and hold the same in unvarying relation, a shaft journaled at the rear of said sleigh, an arm carried centrally thereon, a lever on each end of said shaft, rods connecting each lever and the rear axles and means adapted to actuate said central arm to raise or lower said wheels.

2. A sled, front and rear wheels carried thereon and adapted to be adjusted downwardly to support the sled, extensible connecting rods connecting the front and rear wheels together on each side of the sled and acting to maintain the same an unvarying distance apart and means adjusting the wheels onto and off of the ground.

3. A sled of the class described embracing the combination with the knees of a sled of brackets secured thereon, an arm pivotally connected in each bracket, means on each bracket and adapted when said arms are directed vertically downward to support the same against rearward movement, a wheel journaled at the outer end of each arm, and adapted to project below the runners, a connecting rod adjustable as to length and connecting the axles of the wheels on each side of the sled together and acting to hold the same at unvarying distances apart, a lever engaged on one of said axles, an adjusting mechanism engaged on said lever adapted to swing said wheels upwardly out of engagement with the road or downwardly to support the sled.

4. In a device of the class described a sled, brackets rigidly engaged on the front and rear thereof on each side of the sled, a downwardly directed shoulder on the rear side of each bracket, a yoke arm pivotally engaged at its upper end on said bracket and adapted to bear against the shoulder when directed downwardly, a wheel journaled at the lower end of each arm and adapted to project below the runner of the sleigh, an extensible connecting rod connecting the lower ends of said arms together on each side of the sled and acting to hold the wheels at unvarying distances apart, a shaft journaled on the rear knee, forwardly projecting levers thereon, one on each side of the sled, levers pivotally engaged at the axles of the rear wheels and engaged on the inwardly directed ends of said levers, a rearwardly directed arm on said shaft, shaped to be engaged by the foot and an upwardly extending adjusting rod pivotally engaged on said arm at its extremity and notched for engagement with a suitable detent carried at the rear of the sled and a handle on said adjusting rod.

5. In a device of the class described, a perambulator sled embracing in combination with the knees of the sled, brackets secured thereon and arms pivotally engaged thereon and capable of swinging vertically downward and forwardly and upwardly, a stop to hold the same from rearward movement, wheels journaled on the lower end of said arms, adjusting means for shifting said arms to vertical position and rigidly engaging the same when so adjusted and means adjusting the distance between said wheels when in operative position.

6. A mechanism of the class described embracing brackets adapted to be rigidly engaged on the knees of a sled, arms pivotally engaged thereon, a wheel at the end of each arm, connecting rods adjustable as to length and connecting a front and rear wheel on each side of the sled and adapted to hold said wheels in unvarying relation when adjusted into and out of operative position and means adjusting said wheels downwardly to support the sled or upwardly out of bearing engagement on the ground.

7. In a device of the class described the combination with a sleigh of a wheel pivoted at each corner thereof, an independent axle for each wheel, means adjustably connecting the wheels on the same side of the sleigh and means adapted to adjust the wheels onto or off the ground in any adjustment.

8. In a device of the class described the combination with a sleigh of wheels pivoted thereto, an independent axle for each, adjustable rods connecting the axles on the same side of the sleigh and adapted when adjusted to secure said wheels in unvarying relation and spring controlled means adapted to adjust said wheels into or out of operative position.

9. In a device of the class described the combination with a sleigh of independent adjustable wheels pivoted thereto, a shaft journaled at the rear of said sleigh, operative connections between said shaft and rear wheels, an arm on said shaft, a rod bearing against said arm adapted when depressed to elevate said wheels and when elevated to permit the wheels to rest on the ground, a roller on the end of said rod and means locking said rod in either adjustment.

In testimony whereof I have hereunto subscribed my name in the presence of two subscribing witnesses.

WILLIAM HAXTON.

Witnesses:
WILLIAM C. SMITH,
W. W. WITHENBURY.